(12) United States Patent
Shibukawa

(10) Patent No.: US 7,573,176 B2
(45) Date of Patent: Aug. 11, 2009

(54) DYNAMO-ELECTRIC MACHINE

(75) Inventor: Yuichi Shibukawa, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 420 days.

(21) Appl. No.: 11/638,710

(22) Filed: Dec. 14, 2006

(65) Prior Publication Data

US 2007/0152535 A1    Jul. 5, 2007

(30) Foreign Application Priority Data

Dec. 15, 2005    (JP)    ............................. 2005-361777

(51) Int. Cl.
  *H02K 1/22*    (2006.01)
  *H02K 23/04*    (2006.01)
  *H02K 21/12*    (2006.01)
  *H02K 1/12*    (2006.01)

(52) U.S. Cl. ............. 310/268; 310/156.42; 310/156.62; 310/254

(58) Field of Classification Search ........................ None
See application file for complete search history.

(56) References Cited

FOREIGN PATENT DOCUMENTS

JP    11-356015 A    12/1999

*Primary Examiner*—Scott B. Geyer
*Assistant Examiner*—Jose A Gonzalez Quinones
(74) *Attorney, Agent, or Firm*—Foley & Lardner LLP

(57) ABSTRACT

In a dynamo-electric machine having two rotors, at least one of the rotors is constructed to have a first magnetic path that extends in a circumferential direction of the rotor, at least one of the rotors is constructed to have a second magnetic path that extends in a radial direction of the rotor, and at least one of the rotors is of an interior permanent magnetic type (IPM) and includes an inside yoke that faces an axial end of the stator. A magnetic resistance of a part of the inside yoke by which the same poles of the permanent magnets of the corresponding rotor are magnetically connected is lower than that of another part of the inside yoke by which the different poles of the permanent magnets of the corresponding rotor are magnetically connected.

11 Claims, 3 Drawing Sheets

DYNAMO-ELECTRIC MACHINE

BACKGROUND OF INVENTION

1. Field of the Invention

The present invention relates in general to dynamo-electric machines and more particularly to the dynamo-electric machines of a type that is equipped with a single stator and double rotors and operated with a compound current.

2. Description of the Related Art

Japanese Laid-open Patent Application (Tokkaihei) 11-356015 shows a so-called dynamo-electric machine that is operated with a compound current. The dynamo-electric machine shown by the publication is of a single stator double rotor type including a single stator and inner and outer rotors that are coaxially arranged to form a three-layer construction. Each rotor is equipped with a plurality of permanent magnets that are circumferentially arranged at evenly spaced intervals. At least one of the inner and outer rotors is equipped with an induction coil. The stator is provided with a single coil to which a compound current is applied to generate rotating magnetic fields of which number is the same as that of the rotors. With such arrangement, a rotation of the inner rotor and that of the outer rotor can be independently controlled with a small loss of electric current.

SUMMARY OF THE INVENTION

In dynamo-electric machines of the above-mentioned single stator double rotor type wherein rotation of the inner rotor and that of the outer rotor are independently controlled by a compound current, it inevitably occurs that the magnetic paths of one rotor (viz., inner rotor or outer rotor) pass through the permanent magnets of the other rotor (viz., outer rotor or inner rotor). That is, due to nature of the dynamo-electric machine having two independently controlled rotors, a so-called mutually interfering actions inevitably take place between the inner and outer rotors, which however tends to induce increase in undesirable iron loss.

In order to clarify such undesired phenomenon, FIGS. 3A and 3B are provided which show a conventional dynamo-electric machine 1. But, the dynamo-electric machine shown in the drawings is of an axial gap type that, as is seen from FIG. 3B, comprises generally a fixed single stator 2 that is arranged around a common axis, a front rotor 4 that is positioned in front of the single stator 2 and rotatably arranged around the common axis and a rear rotor 5 that is positioned behind the single stator 2 and rotatably arranged around the common axis. Although not shown in the drawings, rotation of the front rotor 4 and that of the rear rotor 5 are transmitted to a driven device (not shown) through concentrically arranged drive shafts that extend along the common axis. As shown, each of the front and rear rotors 4 and 5 is equipped with a plurality of permanent magnets 3. FIG. 3A is a schematic plan view of the front rotor 4 taken from a direction of the stator 2 and FIG. 3B is a schematic sectional view taken along the line 3B-3B of FIG. 3A.

As is seen from the drawings, under operation of the dynamo-electric machine 1, a plurality of magnetic paths "p" are produced in and along a circumferential direction of the rotors 4 and 5.

As is well understood FIG. 3B, the magnetic paths "p" of the inner rotor 4 (or outer rotor 5) are forced to pass through the permanent magnets 3 of the outer rotor 5 (or inner rotor 4), which however causes a certain increase in magnetic resistance and thus increases the iron loss.

Accordingly, it is an object of the present invention to provide a dynamo-electric machine that is free of the above-mentioned drawbacks.

According to the present invention, there is provided a dynamo-electric machine which comprises a stator having an imaginary axis; and a plurality of rotors that are independently rotatable about the imaginary axis, at least two of the rotors being arranged at axially front and rear positions of the stator, each rotor having a plurality of permanent magnets; wherein at least one of the rotors is constructed to have a first magnetic path that extends in a circumferential direction of the rotor, at least one of the rotors is constructed to have a second magnetic path that extends in a radial direction of the rotor, at least one of the rotors is of an interior permanent magnetic type (IPM) and includes an inside yoke that faces an axial end of the stator; and wherein a magnetic resistance of a part of the inside yoke by which the same poles of the permanent magnets are magnetically connected is lower than that of another part of the inside yoke by which the different poles of the permanent magnets are magnetically connected.

According to the present invention, there is further provided a dynamo-electric machine which comprises a stator having an imaginary axis; and first and second rotors that are arranged at axially front and rear positions of the stator to independently rotatable about the imaginary axis, each rotor having a plurality of permanent magnets mounted thereon; wherein at least one of the first and second rotors is constructed to have a first magnetic path that extends in a circumferential direction of the rotor, at least one of the first and second rotors is constructed to have a second magnetic path that extends in a radial direction of the rotor, at least one of the first and second rotors is of an interior permanent magnetic type (IPM) and includes an inside yoke that faces an axial end of the stator; and wherein a magnetic resistance of a part of the inside yoke by which the same poles of the permanent magnets of the corresponding rotor are magnetically connected is lower than that of another part of the inside yoke by which the different poles of the permanent magnets of the corresponding rotor are magnetically connected.

BRIEF DESCRIPTION OF THE DRAWINGS

Other objects and advantages of the present invention will become apparent from the following description when taken in conjunction with the accompanying drawings, in which:

FIGS. 1A, 1B and 1C are drawings showing a dynamo-electric machine that is an embodiment of the present invention, in which FIG. 1A is a schematic plan view of a front (or first) rotor taken from a direction of a stator, FIG. 1B is a schematic sectional view taken along the line 1B-1B of FIG. 1A, and FIG. 1C is a schematic plan view of a rear (or second) rotor taken from a direction of the stator;

FIGS. 2A and 2B are drawings depicting a relationship in magnetic path between an inside yoke and magnets of the rear (or second) rotor, in which FIG. 2A is a view showing magnetic paths produced in the inside yoke, and FIG. 2B is a development elevation of the inside yoke and associated other parts; and FIGS. 3A and 3B are drawings showing a conventional dynamo-electric machine, in which FIG. 3A is a schematic plan view of a front rotor taken from a direction of a stator and FIG. 3B is a schematic sectional view taken along the line 3B-3B of FIG. 3A.

DETAILED DESCRIPTION OF THE EMBODIMENT

In the following, a dynamo-electric machine 10 that is an embodiment of the present invention will be described in detail with reference to the drawings, particularly FIGS. 1A, 1B, 1C, 2A and 2B.

For ease of understanding, in the following description, various directional terms, such as right, left, upper, lower, rightward and the like are used. However, such directional terms are to be understood with respect to only a drawing or drawings on which a corresponding part or portion is shown.

Figure 1A:
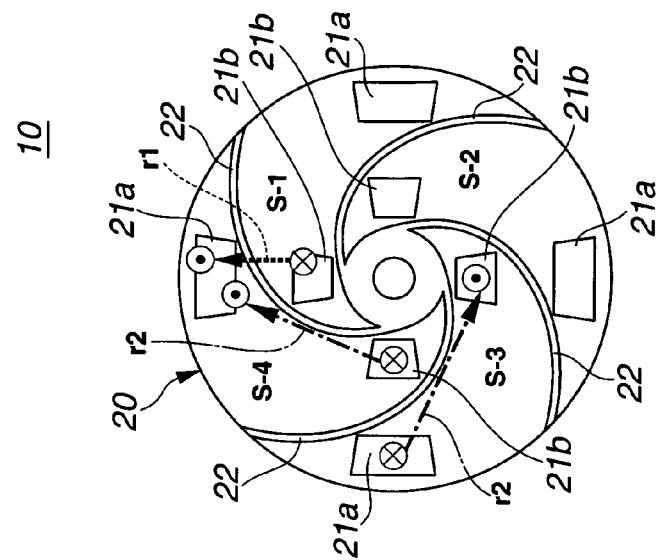
Figure 1B:
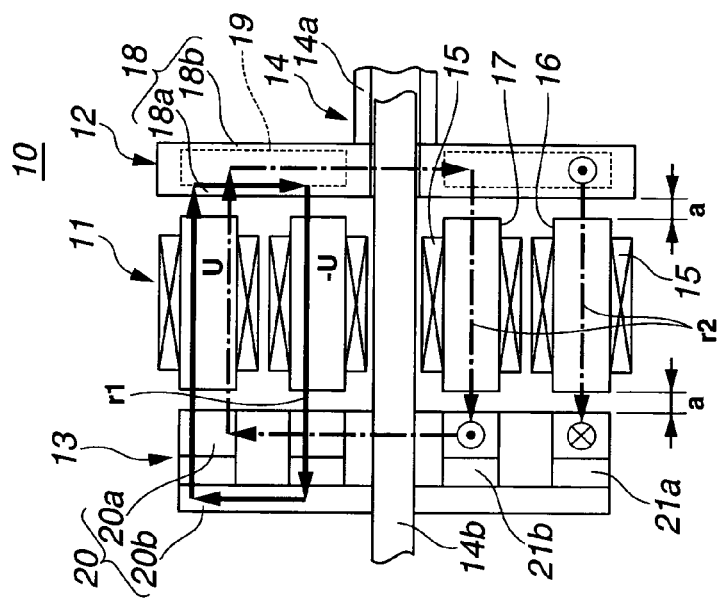
Figure 1C:
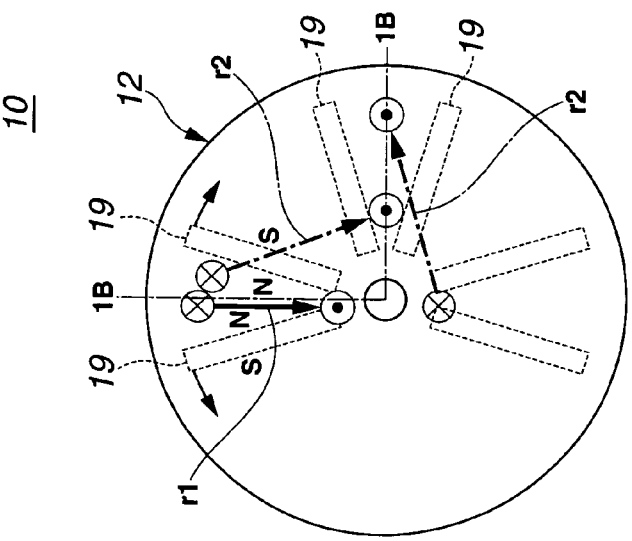

Referring to FIGS. 1A, 1B and 1C, there is shown a dynamo-electric machine 10 according to the present invention. As will become apparent as the description proceeds, the machine 10 of the invention is of an axial gap type that has mutually rotatable and coaxially arranged front and rear rotors at front and back sides of a stator respectively.

As is well shown in FIG. 1B, the dynamo-electric machine 10 comprises generally a fixed annular stator 11 that is arranged about an axis of a rotation shaft unit 14 and first and second rotors 12 and 13 that are coaxially arranged at front and rear positions of the fixed annular stator 11 and independently rotatable about the axis of the rotation shaft unit 14.

As shown, each rotor 12 or 13 is axially spaced from the annular stator 11 by a distance "a".

Rotation shaft unit 14 comprises first and second shafts 14a and 14b that are concentrically arranged and rotatable relative to each other. As shown, the first shaft 14a is hollow in construction and connected at one end to the first rotor 12 to rotate together therewith. While, the second shaft 14b is solid in construction and connected to the second rotor 13 to rotate together therewith. As shown, the second shaft 14b passes through a center portion of the annular stator 11 and has an extension that passes through the hollow of the first shaft 14a. Although not shown in the drawing, suitable annular bearings are arranged between the first and second shafts 14a and 14b to allow a relative rotation therebetween.

The annular stator 11 comprises annular outer and inner stator core units 16 and 17 that are concentrically disposed about rotation shaft unit 14. As shown, the inner stator core unit 17 is concentrically received in the outer stator core unit 16 having an annular space (no numeral) kept therebetween.

Each of the outer and inner stator core units 16 and 17 comprises a plurality of stator cores that are circumferentially arranged around the rotation shaft unit 14 at equally spaced intervals. Each stator core has a stator coil 15 disposed thereabout.

It is to be noted that the outer and inner stator core units 16 and 17 are arranged to have a difference of 180 degrees in electrical angle therebetween. That is, the outer stator core unit 16 has an electrical angle of "U" and the inner stator core unit 17 has an electrical angle of "U-", as shown.

As is seen from FIGS. 1A and 1B, the first rotor 12 comprises a rotor core 18 that includes inside and outside yokes 18a and 18b, and a plurality of permanent magnets 19 that are disposed between the inside and outside yokes 18a and 18b. That is, the first rotor 12 has a so-called interior permanent magnet type structure (IPM).

As shown, the inside yoke 18a coaxially faces the fixed annular stator 11. The permanent magnets 19 are circumferentially arranged about the axis of the rotation shaft unit 14 at suitably spaced intervals. The arrangement of the permanent magnets 19 of the first rotor 12 may be well understood from FIG. 1A.

More specifically, as shown in FIG. 1A, the permanent magnets 19 comprise first and second groups of permanent magnets that are alternatively arranged about the axis of the rotation shaft unit 14. As is seen from FIG. 1A, each magnet 19 is rectangular in shape and arranged to extend radially. Each rectangular magnet 19 has an inner rectangular surface that faces respective axial ends of the outer and inner stator core units 16 and 17 of the annular stator 11.

For the alternative arrangement of the first and second groups of the permanent magnets 19, each magnet 19 of the first group has its N- and S-poles directed leftward and rightward in FIG. 1A, while each magnet 19 of the second group has its N- and S-poles directed rightward and leftward in FIG. 1A.

As is seen from FIGS. 1B and 1C, the second rotor 13 comprises a rotor core 20 that includes inside and outside yokes 20a and 20b, and eight permanent magnets 21a and 21b that are disposed between the inside and outside yokes 20a and 20b. Like the above-mentioned first rotor 12, the second rotor 13 has also a so-called interior permanent magnetic type structure (IPM).

As shown, the inside yoke 20a faces the axial end of the fixed annular stator 11.

As is well seen from FIG. 1C, the eight permanent magnets 21a and 21b constitute radially outer and inner groups of permanent magnets, each group including four permanent magnets 21a and 21b. The four permanent magnets 21a of the radially outer group are arranged on an imaginary outer circle that faces the axial end of the annular outer stator core unit 16 of the stator 11 and the other four permanent magnets 21b of the radially inner group are arranged on an imaginary inner circle that faces the axial end of the annular inner stator core unit 17 of the stator 11.

As is understood from FIG. 1C, the four permanent magnets 21a or 21b of each imaginary circle are arranged at equally spaced intervals.

It is to be noted that as is understood from FIG. 1C, radially neighboring pairs 21a and 21b of the radially outer and inner groups are arranged to have at their mutually facing edges opposite poles (viz., N-pole and S-pole, or S-pole and N-pole), and circumferentially neighboring pairs 21a and 21a (or, 21b and 21b) are arranged to have at their mutually facing edges opposite poles (viz., N-pole and S-pole, or S-pole and N-pole).

As is seen from FIG. 1C, the inside yoke 20a of the rotor core 20 of the second rotor 13 is formed on its surface (viz., the surface facing the axial end of the stator 11) with four spirally extending ridges 22 that spirally outwardly extend from a center raised portion (no numeral) of inside yoke 20a at equally spaced intervals. With these four spiral ridges 22, the surface of inside yoke 20a is divided into four equal helicoidal zones S-1, S-2, S-3 and S-4, as shown.

As shown, each hilicoidal zone S-1, S-2, S-3 or S-4 is arranged and shaped to surround one permanent magnet 21a of the outer group and one circumferentially neighboring permanent magnet 21b of the inner group. Thus, the outer permanent magnet 21a and inner permanent magnet 21b placed in each hilicoidal zone S-1, S-2, S-3 or S-4 have the same polarity in polarity arrangement.

It is to be noted that the four spirally extending ridges 22 are made of non-magnetic material, and thus, the four hilicoidal zones S-1, S-2, S-3 are S-4 are magnetically insulated from one another. If desired, grooves may be employed in place of the ridges 22.

Figure 2A:
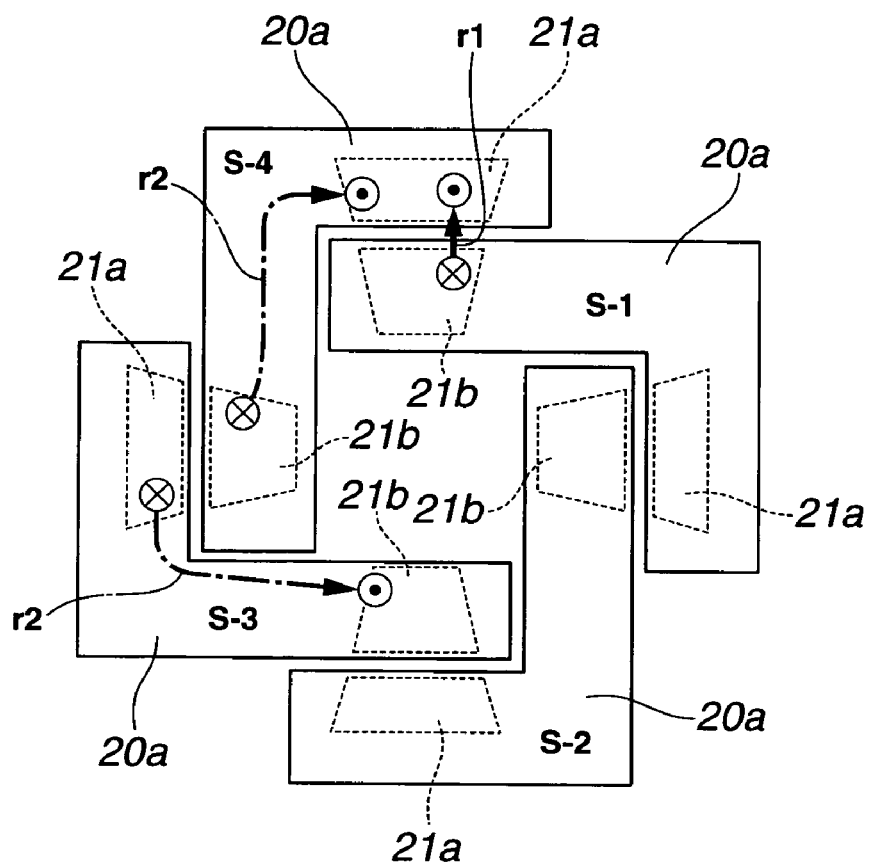
Figure 2B:
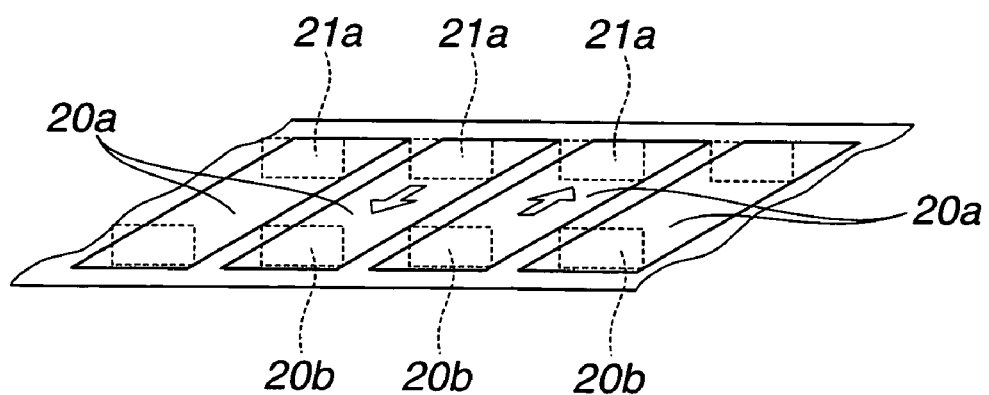
Figure 3A:
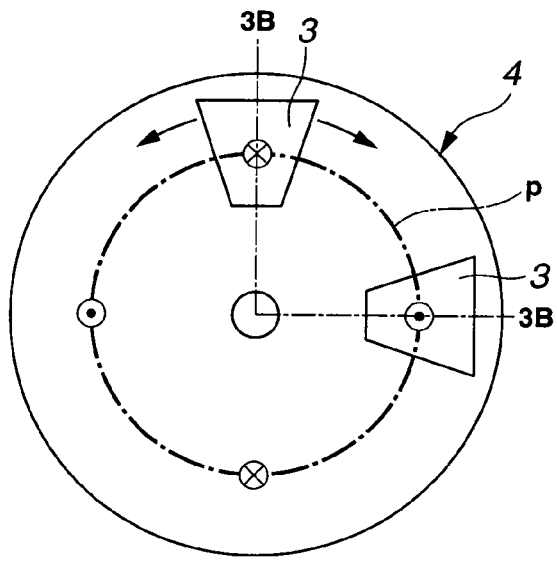
Figure 3B:
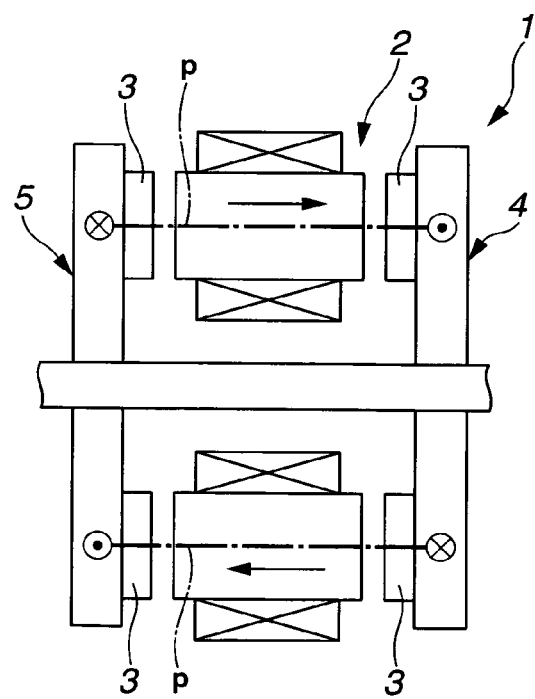

As is seen from FIGS. 2A and 2B, particularly from FIG. 2A, when, due to provision of the four magnetically insulated zones S-1, S-2, S-3 and S-4, the N-pole of the outer permanent magnet 21a and N-pole of the inner permanent magnet 21b (or, S-pole of outer permanent magnet 21a and S-pole of inner permanent magnet 21b) are coupled, there is produced, between the outer permanent magnet 21a and the corresponding inner permanent magnet 21b, a connecting magnetic path that magnetically connects the same poles of the neighboring permanent magnets 21a and 21b.

In the following, operation of the dynamo-electric machine 10 of the invention will be described in detail with reference to the drawings.

When a given compound current is fed to the stator coils 15 of the stator 11 for driving the first and second rotors 12 and 13, there are produced two types of magnetic paths "r1" and "r2", which are a path "r1" used for driving the second rotor 13 and a path "r2" used for driving the first rotor 12.

That is, as will be described in the following, the magnetic path "r1" runs through the inner stator core unit 17, the inside yoke 20a of the second rotor 13, the inner permanent magnet 21b, the outside yoke 20b of the second rotor 13, the outer permanent magnet 21a, the inside yoke 20a, the outer stator core unit 16 and the inside yoke 18a of the first rotor 12 to the inner stator core unit 17.

More specifically, the magnetic path "r1" runs from the inner stator core unit 17 of the stator 11 to the inside yoke 20a of the second rotor 13, then runs radially outward from the inner permanent magnet 21b to the outer permanent magnet 21a through the outside yoke 20b, then from the inside yoke 20a of the second rotor 13 to the outer stator core unit 16 of the stator 11 and then to the inside yoke 18a of the first rotor 12 and comes back to the inner stator core unit 17 of the stator 11.

At the same time, the magnetic path "r2" runs from the inner stator core unit 17 of the stator 11 to the inside yoke 20a of the second rotor 13, then runs in the inside yoke 20a in a circumferential direction to the neighboring outer stator core unit 16 of the stator 11, then runs in a circumferential direction from the outer stator core unit 16 to the neighboring inner stator core unit 17 of the stator 11 while passing through the permanent magnet 19 of the first rotor 12.

Regarding the magnetic path "r2", there may be produced another path "r2" that runs from the outer stator core unit 16 of the stator 11 to the inside yoke 20a of the second rotor 13, then runs in the inside yoke 20a in a circumferential direction to the inner stator core unit 17, then runs from the inner stator core unit 17 to the outer stator core unit 16 while passing through the permanent magnet 19 of the first rotor 12.

During running in second rotor 13, the magnetic path "r1" from the inner stator core unit 17 passes through a radially inner part of the inside yoke 20a where the four inner permanent magnets 21b are arranged, runs in the outside yoke 20b in a radially outward direction, passes through a radially outer part of the inside yoke 20a where the four outer permanent magnets 21a are arranged, and runs toward the outer stator core unit 16.

While, during this, the other magnetic path "r2" from the inner stator core unit 17 or the outer stator core unit 16 runs through the inside yoke 20a without passing through or penetrating the radially outer and inner portions of the inside yoke 20a where the outer permanent magnets 21a and the inner permanent magnets 21b are arranged. That is, the magnetic path "r2" runs in the inside yoke 20a in a circumferential direction to a part of the inside yoke 20a where neighboring inner and outer permanent magnets 21b and 21a are arranged and then the magnetic path "r2" runs therefrom toward the inner stator core unit 17 and the outer stator core unit 16.

That is, in the construction of the second rotor 13, there are produced two types of magnetic paths, one being a magnetic path that extends in a radial direction of the second rotor 13 and the other being a magnetic path that extends in a circumferential direction of the second rotor 13. The magnetic path that extends in the circumferential direction is produced by the inside yoke 20a by which the neighboring outer and inner permanent magnets 21a and 21b of the same polarity are magnetically linked.

In each of first and second rotors 12 and 13, the magnetic path that extends radially is allowed to run on and along a radial path of the rotor 12 or 13 because the outer and inner permanent magnets 21a and 21b are closely arranged in the radial direction of the rotor 12 or 13. In other words, the magnetic path is permitted to take the shortest path.

Accordingly, the magnetic path that passes through an end face of the first rotor 12, that is perpendicular to the axis of the rotation shaft unit 14, can be assuredly shortened as compared with a circumferentially extending magnetic path that would be produced in the conventional technique. Thus, in the invention, due to the shortened magnetic path, undesired iron loss of the dynamo-electric machine 10 can be reduced.

As has been described hereinabove, in the dynamo-electric machine 10 of the invention, the first and second rotors 12 and 13 independently driven by a compound current have the following constructional features. That is, for the first rotor 12, there is formed a magnetic path that extends in a circumferential direction of the first rotor 12, and for the second rotor 13, there is formed a magnetic path that extends in a radial direction of the second rotor 13. In other words, the first and second rotors 12 and 13 have mutually different magnetic paths produced thereon. The first and second rotors 12 and 13 are of the interior permanent magnetic type (IPM). Because of the nature of the IPM structure, the same poles of the permanent magnets 21a and 21b in the second rotor 13 are magnetically linked or connected through the inside yoke 20a.

Usually, when the magnetic path is arranged to extend in a circumferential direction of a rotor, larger iron loss tends to be produced. However, in the invention, the magnetic path is arranged to extend in a radial direction as has been mentioned hereinabove. This means that the length of the magnetic path is shortened in the invention and thus, the work efficiency of the dynamo-electric machine 10 of the invention is assuredly increased. Furthermore, because of usage of the single stator 11, entire size of the machine 10 can be reduced.

If an arrangement is employed in which a first magnetic path that extends in a circumferential direction of a first rotor and a second magnetic path that extends in a radial direction of a second rotor are arranged to pass through the permanent magnets of the other rotors, viz., the second and first rotors, independent rotation of the first and second rotors brings about a certain increase in magnetic resistance and thus torque of the machine tends to be lowered. However, in the present invention, due to the nature of the interior permanent magnetic type (IPM) of the rotors 12 and 13 and usage of the inside yokes 18a and 20a of the first and second rotors 12 and 13, respective magnetic fluxes of the rotors 12 and 13 are allowed to pass through the respective inside yokes 20a and 18a. Thus, in the invention, the magnetic resistance is lowered and thus the torque produced by the machine 10 is increased.

Since, in the invention, different poles are magnetically connected through the inside yoke 20 in order that the magnetic path extending in the circumferential direction of the second rotor 13 is produced by the inside yoke 20a. Such arrangement tends to induce a so-called magnetic short path and thus tends to induce lowering in torque. However, in the invention, a measure is practically employed wherein the magnetic resistance of a part of inside yoke 20a by which the same poles of permanent magnets of second rotor 13 are magnetically connected is lower than the magnetic resistance of another part of the inside yoke 20a by which the different poles of the permanent magnets of second rotor 13 are magnetically connected. That is, in the second rotor 13 wherein the magnetic path is arranged to extend in a radial direction, the same poles of the permanent magnets are magnetically connected by the inside yoke 20a thereby to reduce the magnetic resistance and thus produce a magnetic path that extends in a circumferential direction of the rotor, and in the second rotor 13, different poles of the permanent magnets are not connected by the inside yoke 20a. Accordingly, reduction of torque can be avoided in the invention.

Furthermore, in the invention, another measure is practically employed wherein in a high speed range, a rotor torque produced by the magnetic path that extends in a radial direction of the rotor is larger than a rotor torque produced by the magnetic path that extends in a circumferential direction of the rotor and in a low speed range, the rotor torque produced by the radially extending magnetic path is equal to or smaller than the rotor torque produced by the circumferentially extending magnetic path. Usually, in a dynamo-electric machine such as one of the present invention wherein one rotor is constructed to provide a magnetic path that extends in a circumferential direction of the rotor and the other rotor is constructed to provide a magnetic path that extends in a radial direction of the rotor, the rotor with the circumferentially extending magnetic path has a smaller iron loss than the rotor with the radially extending magnetic path when the machine is subjected to a high speed rotation. Thus, when, in a higher speed rotation, the load of the rotor with the circumferentially extending magnetic path is increased, total work efficiency of the machine 10 is increased.

As is described hereinabove, in the dynamo-electric machine 10 of the invention, at least one of the rotors 12 and 13 is constructed to have a magnetic path that extends in a circumferential direction of the rotor, at least one of the rotors 12 and 13 is constructed to have a magnetic path that extends in a radial direction of the rotor, and at least one of the rotors 12 and 13 has a front yoke due to employment of a so-called interior permanent magnet type structure (IPM). Furthermore, in the invention, the magnetic resistance between the same poles of the permanent magnets through the front yoke is set smaller than that between the different poles of the permanent magnets, and thus, undesirable iron loss can be reduced, which increases the work efficiency of the dynamo-electric machine 10.

Although the above description is directed to the dynamo-electric machine having two rotors, the concept of the invention may be applicable to a dynamo-electric machine having three or over three rotors. Furthermore, if desired, the permanent magnets used in the invention may be of a Halbach type.

The entire contents of Japanese Patent Application 2005-361777 filed Dec. 15, 2005 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A dynamo-electric machine comprising:
a stator having an imaginary axis; and
a plurality of rotors that are independently rotatable about the imaginary axis, at least two of the rotors being arranged at axially front and rear positions of the stator, each rotor having a plurality of permanent magnets;
wherein at least one of the rotors is constructed to have a first magnetic path that extends in a circumferential direction of the rotor, at least one of the rotors is constructed to have a second magnetic path that extends in a radial direction of the rotor, at least one of the rotors is of an interior permanent magnetic type (IPM) and includes an inside yoke that faces an axial end of the stator; and
wherein a magnetic resistance of a part of the inside yoke by which the same poles of the permanent magnets are magnetically connected is lower than that of another part of the inside yoke by which the different poles of the permanent magnets are magnetically connected.

2. A dynamo-electric machine comprising:
a stator having an imaginary axis; and
first and second rotors that are arranged at axially front and rear positions of the stator to independently rotatable about the imaginary axis, each rotor having a plurality of permanent magnets mounted thereon;
wherein at least one of the first and second rotors is constructed to have a first magnetic path that extends in a circumferential direction of the rotor, at least one of the first and second rotors is constructed to have a second magnetic path that extends in a radial direction of the rotor, at least one of the first and second rotors is of an interior permanent magnetic type (IPM) and includes an inside yoke that faces an axial end of the stator; and
wherein a magnetic resistance of a part of the inside yoke by which the same poles of the permanent magnets of the corresponding rotor are magnetically connected is lower than that of another part of the inside yoke by which the different poles of the permanent magnets of the corresponding rotor are magnetically connected.

3. A dynamo-electric machine as claimed in claim 2, in which the first rotor is constructed to have the first magnetic path, the second rotor is constructed to have the second magnetic path, and the second rotor is of the interior permanent magnetic type (IPM) and includes the inside yoke.

4. A dynamo-electric machine as claimed in claim 3, in which the magnetic resistance of the part of the inside yoke of the second rotor by which the same poles of the permanent magnets of the second rotor are magnetically connected is lower than that of the other part of the inside yoke by which the different poles of the permanent magnets of the second rotor are magnetically connected.

5. A dynamo-electric machine as claimed in claim 4, in which the stator comprises annular inner and outer stator core units that are concentrically disposed about the imaginary axis, each stator core unit including a plurality of stator cores that are circumferentially arranged around the imaginary axis at equally spaced intervals, each stator core having a stator coil disposed thereabout.

6. A dynamo-electric machine as claimed in claim 5, in which the second rotor comprises:
a rotor core that includes the inside yoke and an outside yoke, the inside yoke facing the axial end of the stator; and
eight permanent magnets that are disposed between the inside and outside yokes, the permanent magnets constituting radially outer and inner groups of permanent magnets, each group including four permanent magnets, the four permanent magnets of the radially outer group being arranged on an imaginary outer circle that faces an axial end of the annular outer stator core unit of the stator and the four permanent magnets of the radially inner group being arranged on an imaginary inner circle that faces an axial end of the annular inner stator core unit of the stator, radially neighboring pairs of the radially outer and inner groups being arranged to have at their mutually facing edges opposite poles, and circumferentially neighboring pairs of the radially outer and inner groups being arranged to have at their mutually facing edges opposite poles.

7. A dynamo-electric machine as claimed in claim 6, in which the inside yoke of the second rotor is formed, on its surface facing the axial end of the stator, with four spirally extending ridges that spirally outwardly extend from a center portion of the inside yoke at equally spaced intervals, so that there are provided on the surface of the inside yoke four equal helicoidal zones, each helicoidal zone being arranged and shaped to surround one permanent magnet of the outer group and one circumferentially neighboring permanent magnet of the inner group.

8. A dynamo-electric machine as claimed in claim 7, in which the four spirally extending ridges are made of a non-magnetic material.

9. A dynamo-electric machine in claim 7, in which four spirally extending grooves are provided in place of the four spirally extending ridges.

10. A dynamo-electric machine as claimed in claim 2, in which in a high speed range of the machine, a rotor torque produced by the magnetic path that extends in the radial direction of the rotor is set larger than a rotor torque produced by the magnetic path that extends in the circumferential direction of the rotor, and in which in a lower speed range of the machine, the rotor torque produced by the radially extending magnetic path is equal to or smaller than the rotor torque produced by the circumferentially extending magnetic path.

11. A dynamo-electric machine as claimed in claim 2, in which the permanent magnets of the first and second rotors are Halbach permanent magnets.

* * * * *